(12) United States Patent
De Graaff et al.

(10) Patent No.: US 9,161,655 B2
(45) Date of Patent: Oct. 20, 2015

(54) SYSTEM FOR PREPARING A BEVERAGE SUITABLE FOR CONSUMPTION, AND EXCHANGEABLE HOLDER FOR SUCH SYSTEM AND METHOD FOR MANUFACTURING THE EXCHANGEABLE HOLDER

(75) Inventors: Gerbrand Kristiaan De Graaff, Lisse (NL); Hendrik Cornelis Koeling, Amersfoort (NL); Ka Cheung Tsang, Amsterdam (NL); Ralf Kamerbeek, Utrecht (NL)

(73) Assignee: Koninklijke Douwe Egbert B.V., Utrecht (NL)

( * ) Notice: Subject to any disclaimer, the term of this patent is extended or adjusted under 35 U.S.C. 154(b) by 1862 days.

(21) Appl. No.: 12/297,625

(22) PCT Filed: Apr. 19, 2007

(86) PCT No.: PCT/NL2007/050168
§ 371 (c)(1),
(2), (4) Date: May 29, 2009

(87) PCT Pub. No.: WO2007/120051
PCT Pub. Date: Oct. 25, 2007

(65) Prior Publication Data
US 2009/0272275 A1    Nov. 5, 2009

(30) Foreign Application Priority Data

Apr. 19, 2006 (NL) .................................... 1031622
Jun. 29, 2006 (NL) .................................... 1032085

(51) Int. Cl.
*A47J 31/06* (2006.01)
*A47J 31/44* (2006.01)
(Continued)

(52) U.S. Cl.
CPC ................ *A47J 31/41* (2013.01); *A47J 31/405* (2013.01); *A47J 31/407* (2013.01); *B67D 1/0021* (2013.01);
(Continued)

(58) Field of Classification Search
CPC ............ B65D 85/8043; B65D 85/812; B65D 81/3211; B65D 81/3266; B65D 81/32; B65D 81/3216; A47G 19/16; A47G 19/24; A47J 31/0663; A47J 31/005; B05B 7/2443; E03C 1/046; A01C 23/042; A47L 15/4445; B29B 7/7663; G01F 11/266; A47K 5/1202; A23F 5/14; A23C 13/12; A24F 19/06; B65F 1/006
USPC ........ 99/295, 323, 302 R, 279; 239/310, 316, 239/317; 206/0.5, 222, 219; 222/173, 222/145.5, 71, 325; 426/78, 79, 115, 519; 220/501–502, 503, 505
See application file for complete search history.

(56) References Cited

U.S. PATENT DOCUMENTS

| 4,136,202 A | 1/1979 | Favre |
| 5,039,402 A * | 8/1991 | Himelstein .................... 210/121 |

(Continued)

FOREIGN PATENT DOCUMENTS

| EP | 1 462 042 B1 | 9/2004 |
| EP | 1688075 A | 8/2006 |

(Continued)

OTHER PUBLICATIONS

Notice of Allowance for U.S. Appl. No. 12/226,399, mail date Apr. 2, 2012, 5 pages.

(Continued)

*Primary Examiner* — Dana Ross
*Assistant Examiner* — Hemant Mathew
(74) *Attorney, Agent, or Firm* — Foley & Lardner LLP

(57) ABSTRACT

A system (1) for preparing a predetermined amount of beverage suitable for consumption, provided with an exchangeable holder (2, 102), and an apparatus (4) provided with a fluid dispensing device (6) which is detachably connected to the holder (2, 102) for dispensing at least one amount of at least a first fluid, such as water, under pressure to the exchangeable holder (2, 102), wherein the exchangeable holder (2, 102) is provided with at least one storage space (8, 108) which is filled with a second fluid, such as a concentrate, the holder (2, 102) further being provided with at least one first mixing chamber (10, 110), the exchangeable holder (2, 102) comprising a first holder part (198) and a second holder part (199), the first holder part (198) comprising a substantially flat contacting surface (166), and the at least one storage space (8, 108) and the first mixing chamber (10, 110) each comprising a wall (167, 168) offset relative to the contacting surface (166), which, each, form part of the first holder part (198), while the second holder part i(199) s of substantially flat design.

52 Claims, 7 Drawing Sheets

(51) Int. Cl.
*A47J 31/41* (2006.01)
*A47J 31/40* (2006.01)
B67D 1/00 (2006.01)
*B65D 85/804* (2006.01)
*A47J 31/00* (2006.01)
*B67D 1/08* (2006.01)

(52) U.S. Cl.
CPC ............ B67D 1/0044 (2013.01); B67D 1/0895 (2013.01); *A47J 31/005* (2013.01); *B65D 85/8043* (2013.01); *B67D 1/0801* (2013.01); *Y10T 29/53* (2015.01)

(56) References Cited

U.S. PATENT DOCUMENTS

| | | | |
|---|---|---|---|
| 5,472,719 A * | 12/1995 | Favre | 426/77 |
| 5,615,801 A | 4/1997 | Schroeder et al. | |
| 5,842,645 A * | 12/1998 | Degongre et al. | 239/312 |
| 6,419,166 B1 * | 7/2002 | Brzezinski et al. | 239/310 |
| 6,698,333 B2 * | 3/2004 | Halliday et al. | 99/295 |
| 6,758,130 B2 * | 7/2004 | Sargent et al. | 99/295 |
| 6,854,378 B2 * | 2/2005 | Jarisch et al. | 99/295 |
| 7,320,398 B2 * | 1/2008 | Bertl et al. | 206/229 |
| 7,328,651 B2 | 2/2008 | Halliday et al. | |
| 7,640,843 B2 * | 1/2010 | Halliday et al. | 99/295 |
| 7,650,830 B1 * | 1/2010 | Lessis | 99/279 |
| 7,878,108 B2 * | 2/2011 | Mock et al. | 99/295 |
| 2004/0055948 A1 * | 3/2004 | Blum et al. | 210/435 |

FOREIGN PATENT DOCUMENTS

| | | |
|---|---|---|
| GB | 2023086 | 12/1979 |
| NL | 7215523 | 5/1974 |
| WO | WO 01/21292 A1 | 3/2001 |
| WO | WO 02/074143 A2 | 9/2002 |
| WO | WO 02074143 A2 * | 9/2002 |
| WO | WO 2005/019093 A3 | 3/2005 |
| WO | WO 2005/063093 A1 | 7/2005 |
| WO | WO 2005/070816 A1 | 8/2005 |
| WO | WO 2006/005401 A3 | 1/2006 |
| WO | WO 2006/043803 | 4/2006 |
| WO | WO 2007/063503 A2 | 6/2007 |
| WO | WO 2007/063503 A3 | 6/2007 |
| WO | WO 2007/120045 A2 | 10/2007 |
| WO | WO 2007/120046 A2 | 10/2007 |
| WO | WO 2007/120047 A2 | 10/2007 |
| WO | WO 2007/120048 A2 | 10/2007 |
| WO | WO 2007/120049 A2 | 10/2007 |
| WO | WO 2007/120050 A2 | 10/2007 |
| WO | WO 2007/120051 | 10/2007 |
| WO | WO 2007/120052 A2 | 10/2007 |

OTHER PUBLICATIONS

Office Action for U.S. Appl. No. 12/297,631, mail date Apr. 4, 2012, 5 pages.
Notice of Allowance for U.S. Appl. No. 12/297,631, mail date Jul. 19, 2012, 5 pages.
International Search Report for International Application No. PCT/NL2007/050167; international publication date Oct. 25, 2007; 4 pages.
Office Action for U.S. Appl. No. 12/226,399, mail date Aug. 25, 2011, 6 pages.
Office Action for U.S. Appl. No. 12/297,631, mail date Aug. 29, 2011, 9 pages.
Office Action for U.S. Appl. No. 12/297,618, mail date Oct. 25, 2011, 8 pages.
Office Action for U.S. Appl. No. 12/297,623, mail date Oct. 25, 2011, 7 pages.
U.S. Appl. No. 12/297,619, filed Oct. 17, 2008, De Graaff et al.
U.S. Appl. No. 12/297,629, filed Oct. 17, 2008, Koeling et al.
U.S. Appl. No. 12/226,401, filed Oct. 17, 2008, De Graaff et al.
U.S. Appl. No. 12/297,623, filed Oct. 17, 2008, De Graaff et al.
U.S. Appl. No. 12/297,631, filed Oct. 17, 2008, De Graaff et al.
U.S. Appl. No. 12/226,399, filed Oct. 17, 2008, De Graaff et al.
U.S. Appl. No. 12/297,618, filed Oct. 17, 2008, De Graaff et al.
International Search Report for International Application No. PCT/NL2007/050168; mailing date Nov. 27, 20007; 4 pages.

* cited by examiner

SYSTEM FOR PREPARING A BEVERAGE SUITABLE FOR CONSUMPTION, AND EXCHANGEABLE HOLDER FOR SUCH SYSTEM AND METHOD FOR MANUFACTURING THE EXCHANGEABLE HOLDER

CROSS-REFERENCE TO RELATED APPLICATIONS

The present application is a national phase application of International Application No. PCT/NL2007/050168 filed on Apr. 19, 2007 titled "SYSTEM FOR PREPARING A BEVERAGE SUITABLE FOR CONSUMPTION, AND EXCHANGEABLE HOLDER FOR SUCH SYSTEM AND METHOD FOR MANUFACTURING THE EXCHANGEABLE HOLDER", which claims priority to Netherlands Application No. NL 1031622, filed on Apr. 19, 2006, and Netherlands Application No. NL 1032085, filed on Jun. 29, 2006, the full disclosures of all three are hereby incorporated herein by reference.

BACKGROUND

The invention relates to a system according to the preamble of claim 1. The invention also relates to an exchangeable holder for use in such a system. The invention further relates to an apparatus for use in such a system and a method for manufacturing an exchangeable holder.

Such a system is known from WO 2006/043808.

As the holder may be an exchangeable holder which, after being used once for preparing a predetermined amount of beverage suitable for consumption, such as a cup of coffee, is removed from the system by a user and ends up in the waste circuit, it is of importance that the holder can be manufactured so as to be compact and in an inexpensive manner.

SUMMARY

An object of the invention is to provide a solution according to which a holder for use in such a system can be manufactured simply, compactly and inexpensively.

To this end, according to the invention, a system of the initially indicated type is characterized in that the exchangeable holder comprises first holder part and a second holder part, the first holder part comprising a substantially flat contacting surface, and the first storage space and the first mixing chamber each comprising a wall offset relative to the contacting surface, which each form part of the first holder part, while the second holder part is of substantially flat design, and abuts against the contacting surface of the first holder part, the first and second holder part bounding the first storage space and the first mixing chamber.

As, in this manner, the at least one storage space and the first mixing chamber are both included in the first holder part, and are both recessed relative to the contacting surface, the second holder part which is of substantially flat design suffices to provide a substantially sealed off storage space and first mixing chamber. Thus, the second holder part can be manufactured particularly simply and/or inexpensively, for instance as sheet-shaped wall.

It is preferred that the offset walls are offset to a same side relative to the contacting surface, preferably in a direction away from the second holder part.

Preferably, the second holder part is connected to the contacting surface of the first holder part. In this manner, the storage space and the first mixing chamber are sealed off on the side of the contacting surface in a simple manner by means of the second holder part.

In one embodiment, the first holder part is substantially plate-shaped, and the at least one storage space and/or the first mixing chamber are each, at least partly, bounded by a protrusion of the plate-shaped first holder part. Thus, in a very simple manner, the storage space and/or the first mixing chamber is provided in the first holder part.

It is preferred that the first holder part consists of one curved surface. Thus, a first holder part is provided that can be manufactured in a very simple manner. Preferably, the first storage space is located next to the storage space, viewed in the plane of the contacting surface. Preferably, the first storage space and the first mixing chamber are separate chambers, connected or connectable via the first fluid communication.

In a special embodiment, the at least one fluid communication comprises a wall offset relative to the contacting surface. It is preferred that the at least one outflow opening is in fluid communication with the first mixing chamber via at least one outflow channel, while the at least one outflow channel comprises a wall offset relative to the contacting surface. Thus, in a simple and/or inexpensive manner, the at least one outflow channel and/or the at least one fluid communication are provided. Here, for instance the at least one outflow channel and/or the at least one fluid communication are each, at least partly, bounded by a protrusion of the plate-shaped first holder part.

Preferably, the first mixing chamber comprises a first entrance opening and a second entrance opening placed at a distance from the first entrance opening while, in use, the first fluid enters the first mixing chamber via the first entrance opening and the second fluid enters the first mixing chamber via the second entrance opening. Thus, the supply of the first fluid and the second fluid to the first mixing chamber is separated, and mixing of the first and second fluid takes place only in the first mixing chamber so that dosing and mixing can be well controlled.

In one embodiment, the plate-shaped first holder part is manufactured by means of vacuum formation, thermo formation, pressing deep drawing and or deep pressing. As a result, the first holder part can inexpensively be mass-produced.

In a special embodiment, the exchangeable holder is designed as a blister pack, while at least the at least one storage space, and the first mixing chamber and, optionally, the at least one outflow opening, the at least one fluid communication and/or the at least one inlet opening are formed by at least one blister chamber. Such a holder can inexpensively be mass-produced.

It is possible that the exchangeable holder consists of the first holder part and the second holder part connected therewith, and one or more ingredients, such as the second fluid, for the beverage to be prepared. Thus is provided the exchangeable holder with the particularly simple structure.

In one embodiment, the holder is further provided with a second storage space which is filled with a fourth fluid, such as a concentrate, and a second fluid communication between the second storage space and the first mixing chamber for dispensing the fourth fluid to the first mixing chamber while in the second storage space forms part, at least partly, of the dosing device which is further designed for dosed supply of the fourth fluid from the second storage space to the first mixing chamber, while, in use, the first fluid is also supplied under pressure to the first mixing chamber so that the second fluid and/or the fourth fluid on the one side, and the first fluid on the other side, mix together for obtaining the beverage which then leaves the holder via the outflow opening, the second storage space being bounded by the first and second holder part, and the second storage space comprising a wall offset relative to the contacting surface, which forms part of the first holder part.

It is preferred that the system is provided with a holder receiving portion which is designed for detachably receiving the holder for preparing a beverage suitable for consumption, which holder receiving portion is provided with recesses for receiving at least the first storage space, optionally the second storage space, the first mixing chamber and the first fluid communication, which recesses, viewed in cross-sections through a plane parallel to the first wall part of the holder received in the holder receiving portion, have contours which correspond, at least partly, to contours of the first mixing chamber, the first storage space, the optionally second storage space, and the first fluid communication.

BRIEF DESCRIPTION OF THE DRAWINGS

The invention will presently be further elucidated on the basis of the drawing.

In the drawing:

FIG. 3 shows a cross section, in a plane III shown in FIG. 2a, of the holder of FIG. 2a;

FIG. 4 shows a view, in perspective, of a portion of the holder shown in FIG. 2a.

DETAILED DESCRIPTION OF EXEMPLARY EMBODIMENTS

Figure 1A:
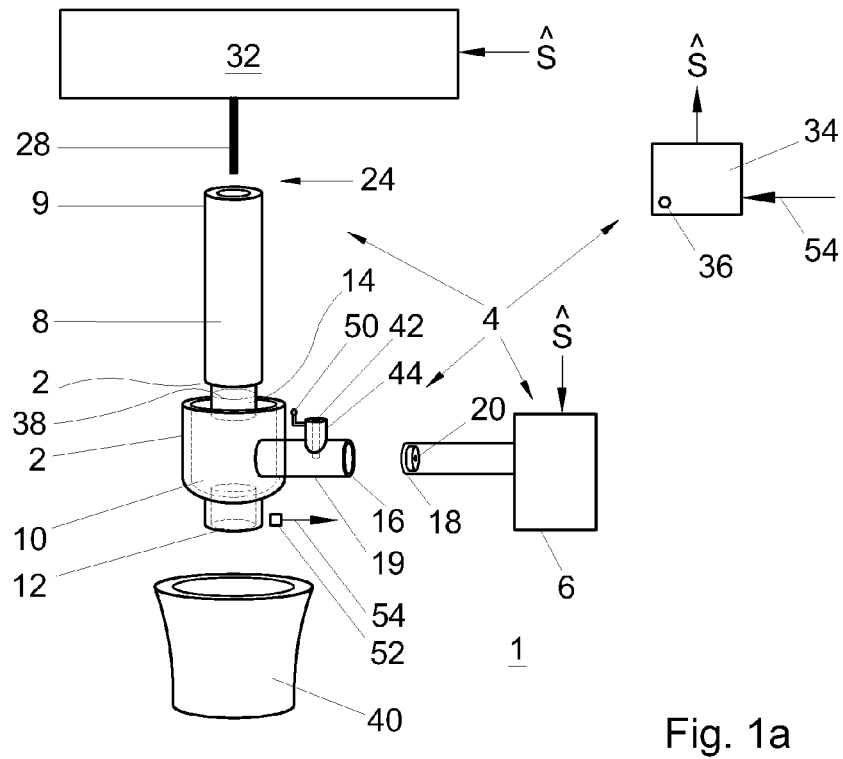
FIG. 1a shows a first embodiment of a system for preparing a predetermined amount of beverage suitable for consumption.
Figure 1B:
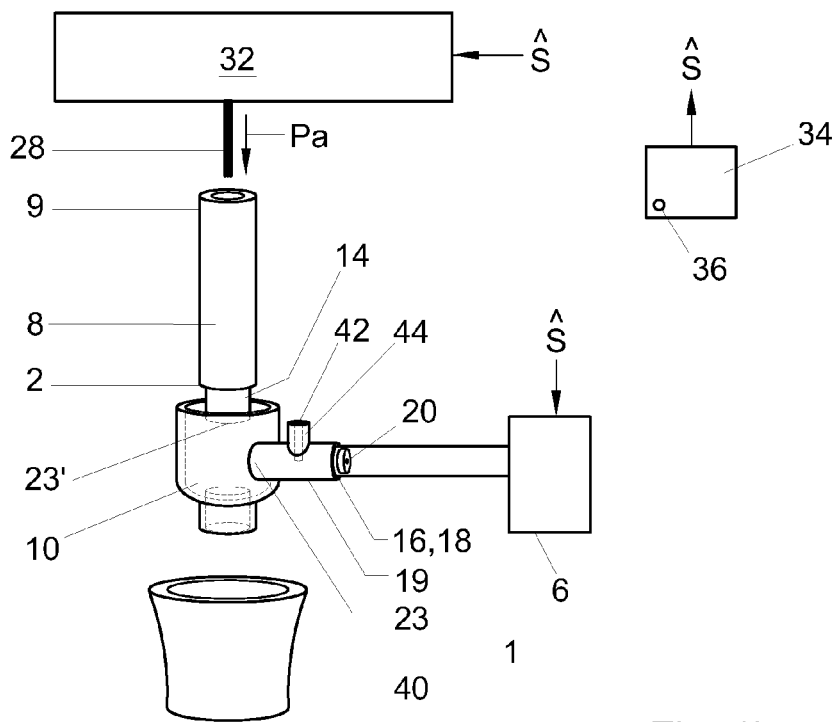
FIG. 1b shows the system according to FIG. 1a in operative condition.
Figure 1C:
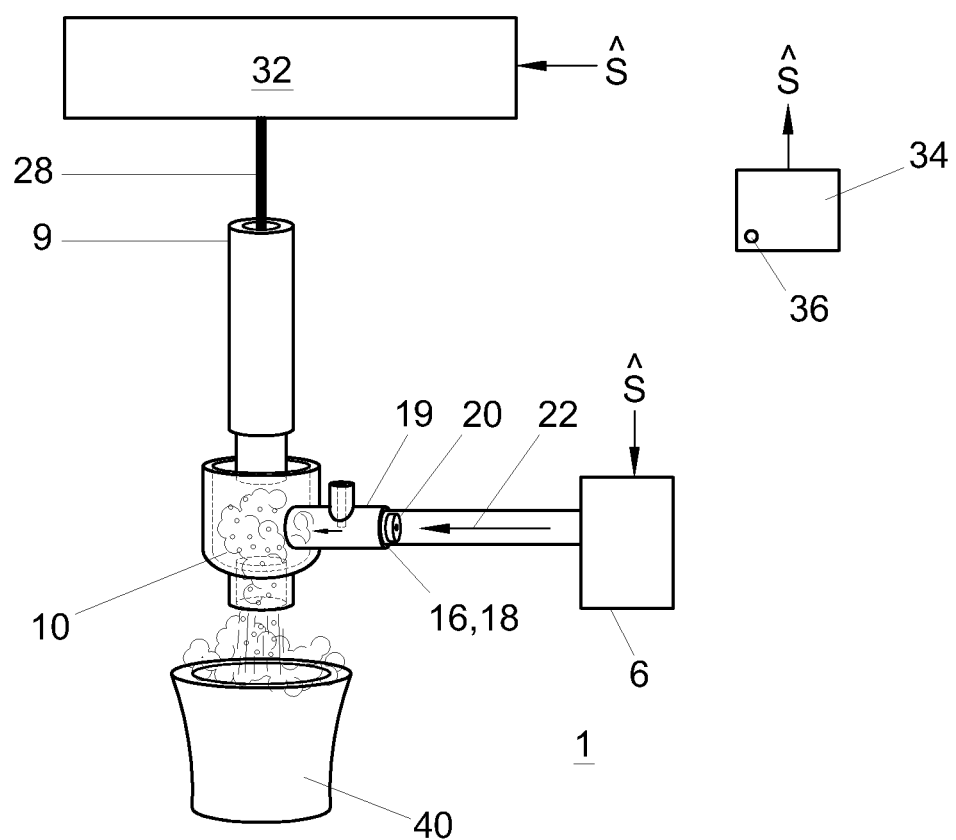
FIG. 1c shows the system according to FIG. 1a in operative condition.

Presently, reference is first made to FIGS. 1a-1c. In these Figures, with reference numeral 1, a system for preparing a predetermined amount of beverage suitable for consumption is indicated. The system (see FIG. 1a) is provided with an exchangeable holder 2.

In FIGS. 1a-1c, for the purpose of the initial description of the system and its operation, the holder 2 is only represented in a highly schematic manner. Further on, with reference to FIGS. 2a, 2b and 3, the exchangeable holder 2 according to the invention will be described further.

The system 1 is further provided with an apparatus 4 which is provided with, inter alia, a fluid dispensing device 6 designed for dispensing, under pressure, at least one amount of at least a first fluid, such as a liquid and/or a gas, more particularly such as water and/or steam. In this example, in use, the fluid dispensing device 6 dispenses water.

The exchangeable holder 2 is provided with at least one storage space 8, which is filled with a second fluid such as a beverage, a concentrate or a powder. In this example, a concentrate for preparing coffee is involved. The holder 2 is further provided with at least a first mixing chamber 10 and at least one outflow opening 12, which is in fluid communication or can be brought in fluid communication with the first mixing chamber 10. The holder 2 is further provided with a fluid communication 14 between the storage space 8 and the first mixing chamber 10. The holder 2 is further provided with at least one inlet opening 16 which is detachably connected to an outlet opening 18 of the fluid dispensing device 6. In FIG. 1a, the inlet opening 16 is not yet connected to the outlet opening 18. This is, however, the case in FIG. 1b. In this example, the inlet opening 16 in FIG. 1a is still sealed off a by a closure which can be removed, such as a removable seal. This also holds for the outflow opening 12. In use, both removable seals are removed, whereupon the outlet opening 18 can be connected to the inlet opening 16 as shown in FIG. 1b.

In this example, the system is further provided with a restriction 20 which is included in a fluid flow path 21 which extends, via the outlet opening 18 of the fluid dispensing device 6, the inlet opening 16 and the first mixing chamber 10, from the fluid dispensing device 6 to the outflow opening 12.

More particularly it holds in this example, that the restriction 20 is included in a fluid flow path 22 which extends, via the outlet opening 18 of the fluid dispensing device 6 and the inlet opening 16 of the exchangeable holder 2, from the fluid dispensing device 6 to the first mixing chamber 10. In this example, the restriction 20 is included upstream of the outlet opening 18 in the fluid flow path 22. In this example therefore, the restriction 20 forms part of the fluid dispensing device 6 of the apparatus 4.

In this example, the system is further provided with a supply channel 19 which is included in the fluid flow path 22 between the restriction 20 and the first mixing chamber 10. In this example, the supply channel 19 is included downstream of the inlet opening 16 in the fluid flow path 22. In this example therefore, the supply channel 19 forms part of the exchangeable holder 2.

The storage space 8 forms at least a part of a dosing device 24 as will further be set forth hereinafter. In this example, this dosing device 24 is further provided with a needle 24 which, in use, is pierced through a wall of the storage space 8 for supplying a third fluid to the second fluid in the storage space 8 for dispensing the second fluid in a dosed manner to the first mixing chamber 10. In this example, the dosing device 24 is further provided with a fluid dispensing unit 32 which is connected to the needle 28. The fluid dispensing unit 32 and the needle 28 form part of the apparatus 4. In this example, the fluid dispensing unit 32 is detachably connectable, at least via the needle 28, to the holder 2.

The apparatus 4 is further also provided with a control device 34 for controlling the fluid dispensing device 6 and the fluid dispensing device 32. To control the fluid dispensing device 6 and the fluid dispensing unit 32, the control device 34 generates control signals ŝ which are supplied to the fluid dispensing device 6 and the fluid dispensing unit 32. In this example, the control device 34 is designed for controlling the fluid dispensing device 6 and the fluid dispensing unit 32 independently of each other.

The apparatus can further be provided with a code reading unit 52 which is connected to the control device 34 by means of a signal wire 54. The exchangeable holder can be provided with, for instance, a readable code in the form of, for instance, a bar code or a code which is stored in a responder known per se. Via the code reading unit 52, the control device 34 reads a code which for instance but not exclusively, indicates whether or not air is to be supplied to the system, what temperature the first fluid is to have, and/or how much first fluid is to be supplied. The code may depend on the type of second fluid stored in the holder 2.

The system 1 described heretofore works as follows. For the purpose of preparing a predetermined amount of beverage suitable for consumption, the exchangeable holder 2 is placed in the apparatus 4. Here, the storage space 8 of the exchangeable holder 2 is placed under the needle 28. Also, as shown in FIG. 1*b*, the outlet opening 18 is connected to the inlet opening 16. The apparatus is now ready for use. By pushing, for instance, a button 36 of the control device 34, the control device provides for the fluid dispensing unit 32 to move the needle 28 in the direction of the arrow Pa. The result thereof is that the needle 28 is pierced through a wall of the storage space 8 and the third fluid is supplied under pressure to the second fluid in the storage space. Consequently, the third fluid will apply a pressure and/or force to the second fluid. Hence, in this example, the pressure in the storage space 8 will increase. Thus, the second fluid is pressurized with the pressure of the third fluid. The fluid communication 14 can here for instance be further provided with a seal 38, in the form of, for instance, a breakable skin 38 which tears open as a result of the increase of the pressure in the storage space 8 resulting from the supply of the third fluid. As a result, in this example, the coffee concentrate will flow in a dosed manner from the storage space 8, via the fluid communication 14 to the first mixing chamber 10. Simultaneously, the control device 34 ensures that the fluid dispensing device 6 is activated. This results in that the fluid dispensing device 6 starts dispensing the first fluid under pressure, in this example water. In this example, this water is hot water with a temperature of, for instance, 80-98° C. This hot water flows via the fluid flow path 22 to the restriction 20. Having arrived at the restriction 20, a jet of the hot water is generated by means of the restriction 20. This jet spouts via the outlet opening 18 and the inlet opening 16 into the first mixing chamber 10. It will be clear that in the example of FIGS. 1*a* and 1*b*, the first mixing chamber 10 comprises a first mixing chamber 10 and a first entrance opening 23 and a second entrance opening 23' placed at a distance from the first entrance opening while, in use, the first fluid enters the first mixing chamber via the first entrance opening and the second fluid enters the first mixing chamber via the second entrance opening.

In the first mixing chamber 10, the hot water will start mixing well with the concentrate. Here, the flow rate at which the concentrate is supplied to the first mixing chamber 10 is regulated by the control device 34, through control of the fluid dispensing unit 32. The flow rate at which the hot water is supplied to the first mixing chamber 10 is further also regulated by the control device 34 through control of the fluid dispensing device 6. In the first mixing chamber, as a result of the jet, the concentrate will mix well with the hot water, so that the beverage is formed. This beverage can then leave the outflow opening 12 and be captured in, for instance, a mug 40.

As, with the system 1 according to the invention, both the dosing of the concentrate over time and the dosing of the hot water over time can be regulated well, it can be ensured that the concentration of the amount of concentrate in the beverage can be accurately determined. Furthermore, it can be ensured that the beverage which, during its preparation, leaves the outflow opening 12, is of constant quality, i.e., the concentration of the concentrate in the beverage that is dispensed can be kept constant during dispensing, if desired. The fact is that in this example, the flow rate of the water and the flow rate of the concentrate supplied to the first mixing chamber 10 can each, if desired, be controlled independently of each other. Therefore, it holds in this example, that the system 1 is designed such that the fluid dispensing device 6 and the dosing device 24 can supply, independently of each other, the first fluid and the second fluid, respectively, to the first mixing chamber 10. This entails that the size of the flow rate of the first fluid and the period during which the first fluid is dispensed are independent (in this example through control of the control device) of the size of the flow rate of the second fluid and the period during which the second flow rate is dispensed.

It further holds in this example, that the dosing device 24 is a controllable and active dosing device for supplying the second fluid to the first mixing chamber by applying an increased pressure or force to the second fluid. Herein, an active dosing device is understood to mean that the second fluid flows through the fluid communication from the storage space to the first mixing chamber as a result of an excess pressure or force applied on the side of the storage space.

In the example, the system 1 is further provided with an air inlet opening 42. The air inlet opening 42 ensures that air is supplied to the first mixing chamber 10 so that, in use, air is whipped into the beverage for obtaining a beverage with a fine-bubble froth layer. Thus, for instance, a café crème can be obtained. In this example, downstream of the restriction 20, the air inlet opening 42 is in fluid communication with the first mixing chamber 10. In this example, the air inlet opening 42 terminates, via a fluid communication 44, into the fluid flow path 22, in this example in the supply channel 19. In this example it therefore holds, that the air inlet opening 42 and the supply channel 19 each form part of the apparatus 4. This is, however, not required. It will be clear that the air inlet opening 42 and/or the supply channel 19 can form part of the exchangeable holder 2.

After the beverage, in this example coffee with a fine-bubble froth layer, has been prepared, the control device 34 stops the fluid dispensing device 6. The control device 34 also ensures that the third fluid is no longer supplied to the second fluid in the storage space, and that the needle 28 is retracted from the respective wall of the storage space 8, i.e., in a direction opposite that of the arrow Pa. Here, it may be such that the control device 34 first provides that the dispensing of the second fluid to the first mixing chamber is stopped and that after that, the supply of the first fluid (in this example, water) is stopped. Thus, the risk of the second fluid contaminating, for instance, the restriction 20 is reduced.

FIG. 1*c* shows a situation where the needle 28 is pierced through a wall of the storage space 8 and the third fluid is supplied under pressure to the second fluid in the storage space 8. The situation shown occurs at the moment when the control device 34 will stop the supply of hot water to the first mixing chamber 10, will no longer effect the supply of the third fluid to the second fluid in the storage space 8, and will effect the retraction of the needle 28 from the respective wall of the storage space 8*n* so that, thereupon, the holder 2 can be taken from the apparatus 4 again.

After this, a user can remove the exchangeable holder 2 and, if a new amount of beverage is to be prepared, place a new exchangeable holder in the apparatus 4. The new exchangeable holder can be provided with an entirely different type of second fluid such as, for instance, a milk concentrate. When, with the aid of the new exchangeable holder, milk is prepared in a manner comparable to that as described for the preparation of coffee based on coffee concentrate, in the prepared milk, no trace will be found of the previously prepared type of beverage. The fact is that the first mixing chamber 10 forms part of the exchangeable holder and when a new exchangeable holder is placed in the apparatus 4, also, an entirely new and, hence, clean first mixing chamber is placed in the holder. Therefore, contamination cannot be involved.

In the example of FIGS. 1a-1c, the dosing device 24 is designed for supplying the third fluid under pressure to the second fluid in the storage space 8 for dispensing the second fluid in a dosed manner to the first mixing chamber 10. It will be clear that in addition or as an alternative, the dosing device 24 can be provided with a compressing unit for compressing the storage space 8 for dispensing the second fluid to the first mixing chamber in a dosed manner, as described in, for instance, WO 2006/04380.

In the example of FIGS. 1a-1c, the jet of the first fluid spouts into the first mixing chamber 10. It is possible that here, the jet impacts on an inside wall of the first mixing chamber 10, while swirls are formed in the first mixing chamber 10, resulting in that the concentrate, the first fluid and, optionally, air are mixed together. It is also possible that the jet impacts on a jet impact element in the first mixing chamber 10. Upon impact of the jet on the jet impact element, the liquid is atomized, so that air can be whipped in well.

Figure 2A:
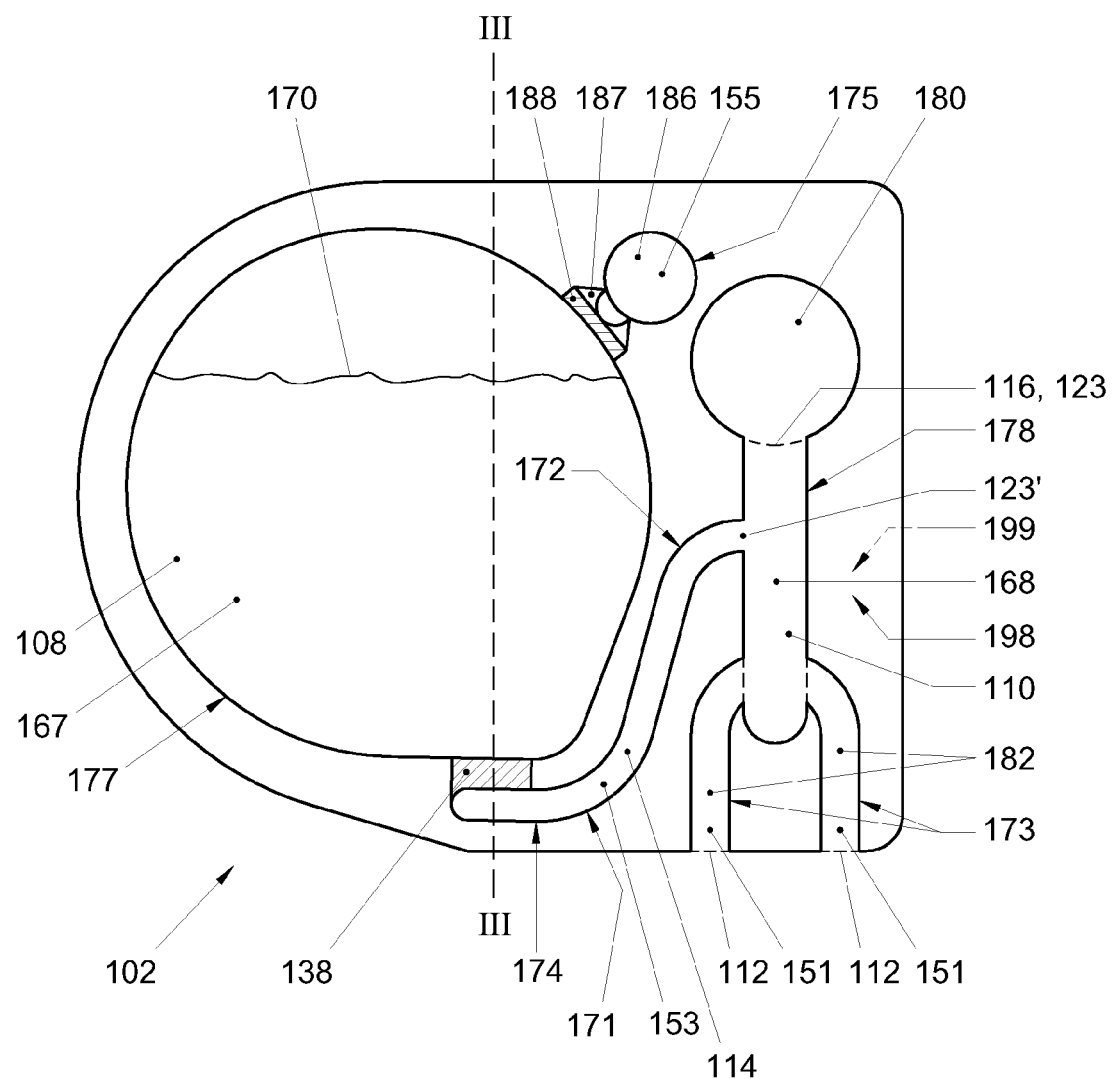
FIG. 2a shows an example of an embodiment of an exchangeable holder according to the invention.
Figure 3:
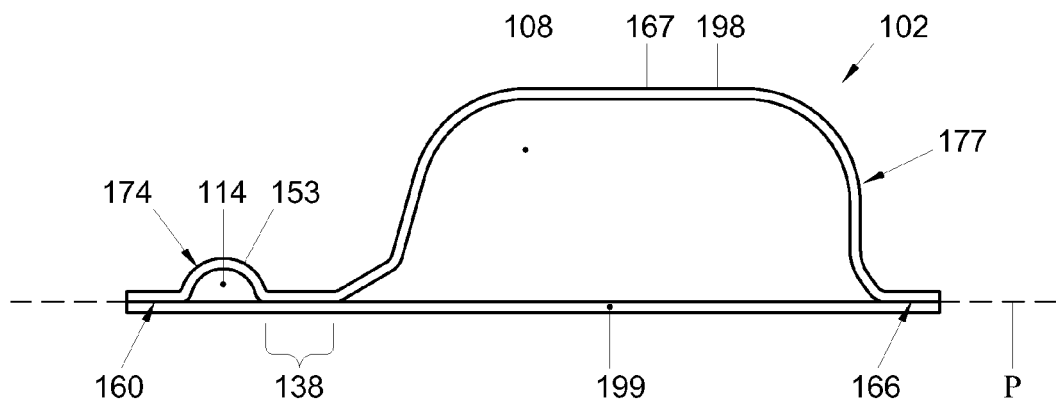

Reference is now made of FIGS. 2a and 3. As indicated above, for the purpose of the initial description of the system and its operation, the holder 2 is represented in FIGS. 1a-1c only in a highly schematic manner. For the further description of the holder 2, presently, reference is first made to FIGS. 2a and 3 in which, by way of example, this holder for use in the system shown in FIGS. 1a-1c is shown.

The holder 2, storage space 8, first mixing chamber 10, outflow opening 12, fluid communication 14, inlet opening 16, entrance openings 23 and 23' and seal 38 shown in FIGS. 1a-1c are indicated in FIGS. 2a and 3 as the holder 102, the storage space 108, the first mixing chamber 110, the outflow opening 112, the fluid communication 114, the inlet opening 116, entrance openings 123, 123' and the fluid communication seal 138, respectively. It is noted that in the example shown, the holder 102 has two of such outflow openings 112. In this example, the outflow openings 112 are each in fluid communication with the first mixing chamber 10 via an outflow channel 182.

The holder 102 comprises a first holder part 198 and a second holder part 199 (see FIG. 3). FIG. 2a is a top plan view to the side of the holder 102 where the first holder part 198 is situated. FIG. 3 is a cross section along the line II-III in FIG. 2a.

The storage space 108 and the first mixing chamber 110 are formed by the first holder part 198 and the second holder part 199. In this example, the storage space 108 is bounded, at least substantially, by the first holder part 198 and the second holder part 199. In this example, the first mixing chamber 110 is bounded, at least substantially, by the first holder part 198 and the second holder part 199.

The second holder part 199 is of substantially flat design. That means that the second holder part extends substantially in a (virtual) plane P. The first holder part 198 comprises a substantially flat contacting surface 166 which extends substantially parallel to the plane P. The second holder part 199 abuts against the contacting surface 166 of the first holder part 198. In this example, the second holder part 199 is connected to the first holder part 198 at the contacting surface 166, by means of, for instance, gluing, welding and/or sealing.

The storage space 108 comprises a wall 167 which is offset relative to the contacting surface 166. The first mixing chamber 110 also comprises a wall 168 which is offset relative to the contacting surface 166. The walls 167, 168 each form part of the first holder part 198. In this example, the walls 167, 168 are both offset to the same side relative to the contacting surface, in a direction away from the second holder part 199. This offers the advantage that the first holder part 198 can be manufactured in a simple manner, and that the second holder part 199 can be connected to the contacting surface 166 in a simple manner. In the example of FIGS. 2a and 3, the first holder part 198 is substantially plate-shaped. The wall 167 forms part of a protrusion 177 of the plate-shaped first holder part 198 which bounds the storage space 108, together with, at least a part of, the second holder part 199. The wall 168 forms part of a protrusion 178 of the plate-shaped first holder part 198 which bounds the first mixing chamber 110, together with, at least a part of, the second holder part 199.

Figure 4:
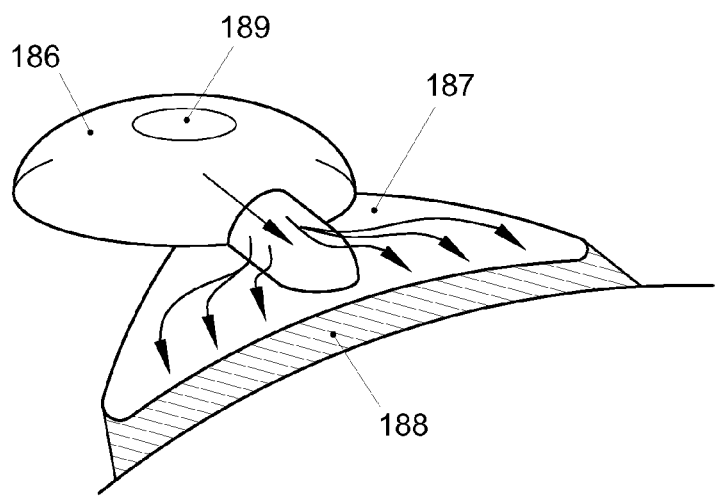

Hereinabove, with reference to FIG. 1, it is set forth that the needle 28 is pierced through a wall of the storage space 8 and the third fluid is supplied, under pressure, to the second fluid in the storage space. With the exchangeable holder according to example of FIGS. 2a and 3, the needle 28 is not directly pierced into the storage space 108, but in a fluid inlet chamber 186 which is in fluid communication or can be brought in fluid communication with the storage space 108. The fluid inlet chamber 186 is also shown in FIG. 4.

In this example, the fluid inlet chamber 186 communicates, via a zone 187 in which the first holder part 198 is not attached to the second holder part 199, with a peel seal 188, i.e., a weakened part with respect to the sealing attachment between, on the one side, material from which the first holder part is manufactured and, on the other side, material of the second holder part. In the manufacturing process of the exchangeable holder, the weakened location can be realized in a simple manner, for instance if the first and second holder part are sealingly interconnected by means of heating and compressing of the first and second holder part, by locally reducing the heating temperature and/or the compression pressure, and/or by locally utilizing a coating, wax or the like between the first and second holder part. The peel seal is a compact and inexpensively manufactured solution for bringing the fluid communication into operation through removal of the sealing action of the peel seal.

In this example, the peel seal 188 adjoins the storage space 108. The needle 28 (see FIG. 1) of the dosing device 24 can be pierced through a wall part 189 (see FIG. 4) of the fluid inlet chamber 186. In this manner, the third fluid can be supplied to the fluid inlet chamber 186, whereupon the third fluid can be supplied under pressure via the zone 187 and the peel seal 188 to the storage space 108. In FIG. 4, the fluid direction of the third fluid is indicated with the aid of arrows. In this example, with the aid of the zone 187, a relatively large effective surface of the peel seal 188 is obtained, on which surface the pressure of the third fluid can act for opening the peel seal 188.

In the example of FIGS. 2a and 3, the outflow channels 182, the fluid connection 114, and the fluid inlet chamber 186 each comprise a wall 151, 153, 155 offset relative to the contacting surface 166. In this example, the walls 151, 153, 155, 167, 168 are each offset to the same side relative to the contacting surface, in a direction away from the second holder part 199. In this example, the walls 151, 153, 155 each form part of a protrusion 173, 174, 175 of the plate-shaped first holder part 198 which, together with at least a part of the second holder part 199, bound the outflow channels 182, the fluid connection 114 and the inlet opening 186, respectively.

The first holder part 198, comprising the protrusions 177 and 178 which bound the storage space 108 and the first mixing chamber 110, respectively, can be advantageously manufactured by means of vacuum formation, thermo formation, pressing, deep drawing and/or deep pressing. In this example, the first holder part 198 therefore consists of one curved surface. In this manner, it is possible to inexpensively and rapidly mass-produce the first holder part 198, if desired. Here, the first holder part is manufactured from, for instance, plastic.

In the example of FIGS. 2a and 3, the second holder part 199 is designed as a sheet-shaped wall, which, in this example, is connected to the contacting surface 166 of the first holder part 198. To that end, the second holder part is designed as, for instance, a foil of, for instance, plastic and/or metal.

In a special embodiment, the exchangeable holder 102 is designed as a blister pack, while the first holder part 198 is provided with blister chambers (designed here as the protrusions 173, 174, 175, 177, 178) and the second holder part 199 forms a covering of the blister chambers. In the example of FIGS. 2a and 3, the storage space 108, the first mixing chamber 110, the outflow channels 182, the fluid communication 114, and the fluid inlet chamber 186 are each formed by one of the blister chambers. In this example, the blister chambers are in fluid communication with each other or can be brought in fluid communication with each other.

In this example, the storage space 108 and the mixing chamber 110 are separate chambers, connected via the fluid communication 114.

In the example of FIGS. 2a and 3, the exchangeable holder 102 is further provided with the fluid communication seal 138 for bringing the fluid communication 114 into operation through removal of the sealing action of the fluid communication seal 138. In the example shown, the fluid communication seal 138 is a peel seal 138, similar to, for instance, the peel seal 188.

In this example, the fluid communication 114 is a channel which is not straight in the longitudinal direction of the channel. In FIG. 2a for instance, it is shown that, in longitudinal direction of the channel, the fluid communication 114 has a first curvature 171 in a plane parallel to the covering 199.

The exchangeable holder 102 is further provided with a chamber 180 which communicates, via the inlet opening 116, with the first mixing chamber 110. Via this chamber 180, the outlet opening 18 of the fluid dispensing device 6 can be connected to the inlet opening 116. Then, the chamber 180 can also be bounded, at least partly, by a wall which is offset relative to the contacting surface. Here, the chamber 180 can be formed, at least partly, by a protrusion of the first holder part 198, for instance a blister chamber of the first holder part.

Figure 5:
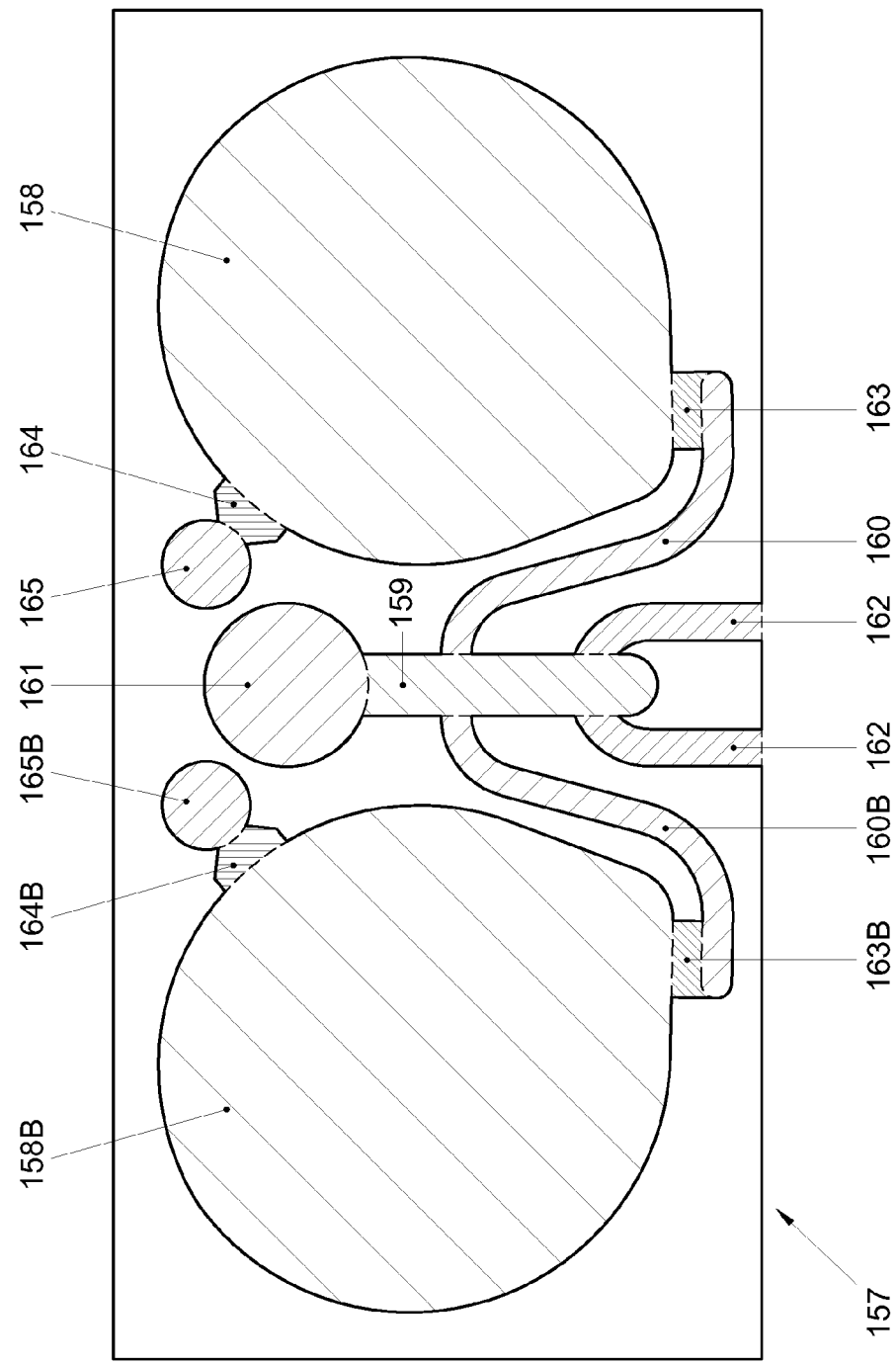
FIG. 5 shows a front view of a holder receiving portion of an apparatus of a system according to the invention.

Reference is now made to FIG. 5. In FIG. 5 is shown a holder receiving portion 157 of the apparatus 4. The holder receiving portion 157 is designed for detachably receiving the exchangeable holder 102 for preparing a beverage suitable for consumption. In this example, the holder receiving portion 157 is provided with protrusion receiving recesses for receiving protrusions of the holder 102. For instance, a first protrusion receiving recess 158 is designed for receiving the protrusion 177 which bounds the storage space 108, a second protrusion receiving recess 159 for receiving the protrusion 178 which bounds the first mixing chamber 110, and a third protrusion receiving recess 160 for receiving the protrusion 174 which bounds the fluid communication 114. These protrusion receiving recesses 158, 159, 160 have contours, viewed in cross sections through a plane parallel to the first holder part 199 of the holder 102 received in the holder receiving portion 157, which corresponds at least partly to contours of the protrusions which bound the storage space 108, the first mixing chamber 110 and the fluid communication 114.

The holder receiving portion 157 is further provided with further recesses, i.e., a recess 161 for receiving the chamber 180, two recesses 162 for receiving the outflow channels 182, a recess 163 for receiving the peel seal 138 and having it detach under pressure, a recess 164 for receiving the zone 187 and the peel seal 188 and having them detach under pressure, and a recess 165 for receiving the fluid inlet chamber 186.

It is noted that in FIG. 5, a recess is deeper according as the hatching lines represented in this recess are closer together. For instance, in the example of FIG. 5, the first protrusion receiving recess 158 (intended for the storage space 108) is deeper than the second protrusion receiving recess 159 (intended for the first mixing chamber 110) which, in turn, is deeper than the third protrusion receiving recess 160 (intended for the fluid communication 114). However, other mutual depth proportions for the different recesses are also possible. It is further noted that the view shown in FIG. 5 is a view in the direction of increasing depth of the recesses.

For preparing a beverage suitable for consumption, the holder 102 shown in FIG. 2a can be placed by a user in the holder receiving portion 157 of the apparatus 4 shown in FIG. 5. In placed condition, the holder 102 is situated substantially at the center part and right hand part of the holder receiving portion 157 shown in FIG. 5. Thus, the preparation of the beverage can take place as described hereinabove with reference to FIGS. 1a-1c.

In placed condition, the holder 102 is, in operation, preferably in a position such that the outflow opening(s) 112 are situated on a side facing downwards of the first mixing chamber 110. Here, the holder 102 can, for instance, be placed such that the first holder part 199 of the exchangeable holder 102 is placed vertically. When placing in the holder receiving portion 157, the exchangeable holder 102 may still be placed with the first holder part 199 of the holder 102 horizontally, and then, for bringing the system in the operative condition, the holder receiving portion 157 can be turned such that the exchangeable holder 102 is placed vertically.

In FIG. 2a, reference numeral 170 indicates the level of the second fluid in the storage space 108 when the holder 102 is placed and is in operative condition. According as, in operation, more and more of the second fluid is supplied to the first mixing chamber, the level 170 drops more and more. In order to optimally empty the storage space 108, it is advantageous when, in operation, the location where the second fluid flows from the storage space 108 is situated as far downwards as possible. In the example shown, the peel seal 138 is therefore situated at a position as much downwards as possible relative to the storage space 108.

The above-mentioned correspondence of the contours of the protrusion receiving recesses to the contours of the protrusions offers the advantage that in operation, the holder receiving portion 157 contributes to the wall parts of the first holder part forming the protrusions being held in place when pressure is applied to these wall parts. This being the case, it is advantageous when parts of the contours of the protrusion receiving recess 160 of the holder receiving portion 157 correspond at least partly to parts of the contours of the first curvature 171 of the fluid communication 114. In this respect, it is further advantageous when parts of the contours of the protrusion receiving recess 160 of the holder receiving portion 157 correspond at least partly to parts of the contours of the second curvature 172 of the fluid communication 114, so that the protrusion receiving recess 160 proceeds at least partly in an S-shape. In this example, the contours of the holder receiving portion 157 correspond to the contours of the mixing chamber 110, the storage space 108 and the fluid communication 114.

Figure 2B:
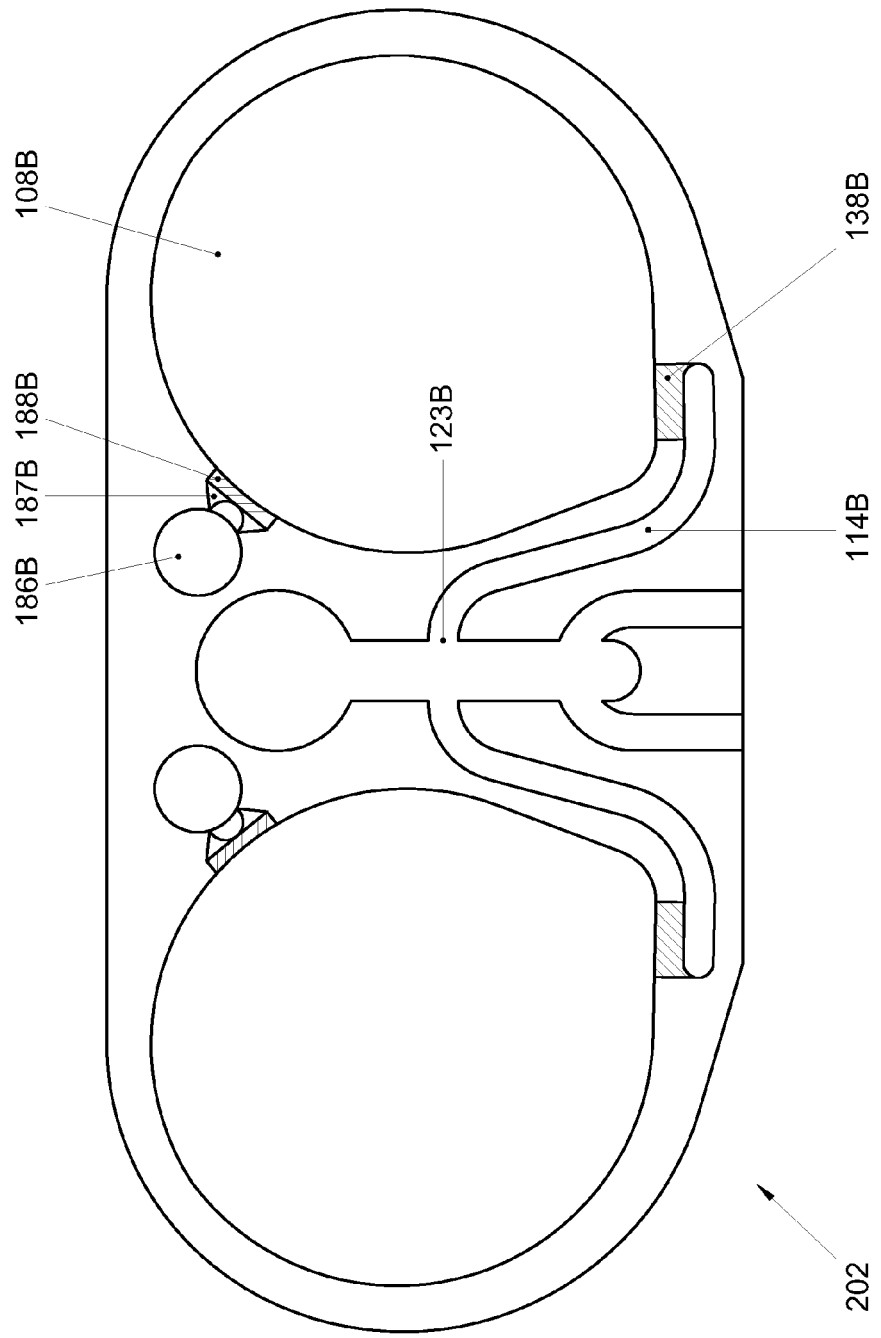
FIG. 2b shows an example of another embodiment of an exchangeable holder according to the invention.
Figure 2C:
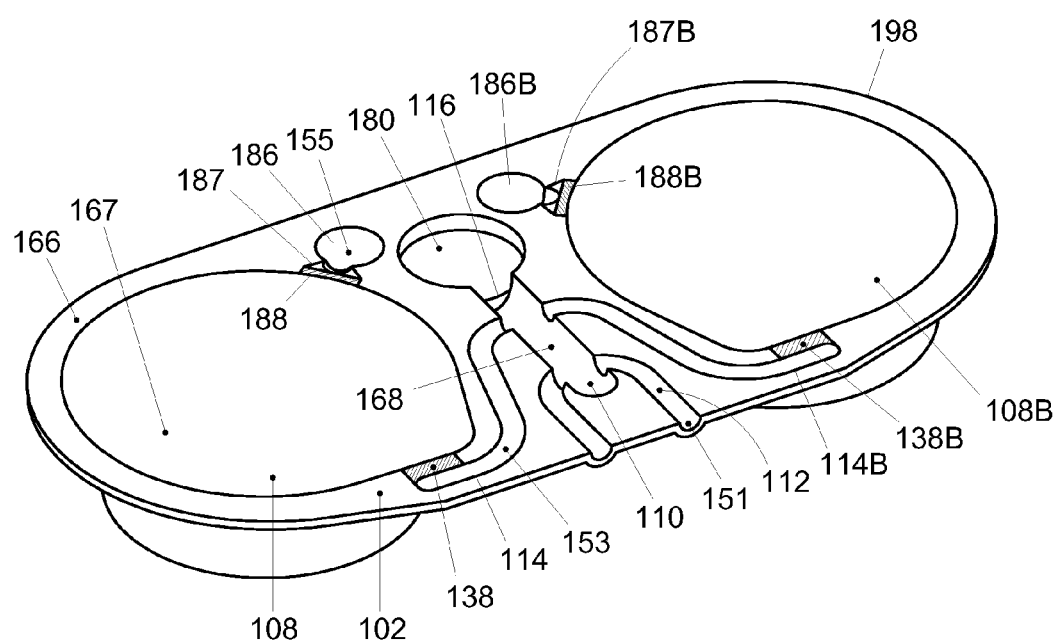
FIG. 2c shows a view in perspective of the exchangeable holder shown in FIG. 2b.

Presently, reference is made to FIGS. 2b and 2c, in which a holder 202 is shown. The difference between the holders 102 and 202 is that the holder 202 comprises a second storage space 108B, similar to the storage space 108, and a second fluid communication 114B, similar to the fluid communication 114. In the two storage spaces 108 and 108B, mutually different second fluids may be stored, for instance a coffee concentrate in one, and a milk concentrate in the other. The holder 202 also comprises a second fluid inlet chamber 186B, a second zone 187B, a second peel seal 188B, and a second peel seal 138B and a third entrance opening 123B, each similar to the fluid inlet chamber 186, the zone 187, the peel seal 188 and the peel seal 138, and the entrance opening 123', respectively. It is noted that in FIG. 2b, for the sake of clarity of FIG. 2b, the reference numerals included in FIG. 2a are not included again.

The holder 202 having the two storage spaces 108 and 108B can be used in a system which is provided with a dosing device which is designed for dispensing the second fluids in a dosed manner from the two different storage spaces to the first mixing chamber. With respect to the example shown in FIG. 1, the dosing device can comprise, to this end, in addition to the needle 28, for instance a second needle, while the second needle can then be introduced into the second chamber 186B.

For preparing a beverage suitable for consumption, also, the holder 202 can be placed on the holder receiving portion 157 shown in FIG. 5 of the apparatus 4. The holder receiving portion 157 shown in FIG. 5 is therefore suitable for the holder 102 shown in FIG. 2a, as well as for the holder 202 shown in FIG. 2b.

Preferably, the two storage spaces 108 and 108B are situated on opposite sides of the first mixing chamber 110 and, also, the two fluid communications 114 and 114B are situated on opposite sides of the first mixing chamber 110, as is the case in the example shown in FIGS. 2b and 2c. In this manner, the compactness of the holder 102 is realized, while then, the associated holder 102, having only one storage space 108, but still fitting in the same holder receiving portion 157, is also compact.

As stated, the fluid communication 114 is a channel having, in longitudinal direction of the channel, a first curvature 171 in a plane parallel to the first holder part 199. It is further advantageous when the channel has a second curvature in this longitudinal direction in the plane mentioned, indicated with reference numeral 172 in FIG. 2a, which second curvature is preferably the opposite of the first curvature so that the channel has a S-shaped portion. The first and/or second curvature 171, 172 contribute to an increased flow resistance of the fluid communication 114. In addition, with the aid of the second curvature 172, the fluid communication 114 can be designed such that a favourable inflow of the second fluid into the first mixing chamber 110 can be realized. Thus, it can for instance be ensured, with the aid of the second curvature 172, that the fluid communication 114 links up at a more or less locally right angle to the first mixing chamber 110, so that the second fluid, upon entering the first mixing chamber 110, on the one side, does not tend too much towards the direction of the inlet opening 116, and, on the other side, does not tend too much in the direction of the outflow openings 112.

In order to avoid that the second fluid does not obtain sufficient opportunity to mix with the first fluid in the first mixing chamber 110, it is advantageous that the location where the fluid communication 114 link up with the first mixing chamber is not too close to the location where the outflow channels 182 link up with the first mixing chamber 110. When the first mixing chamber 110 is provided with an air inlet opening for supplying air to the first mixing chamber, so that, in use, air is whipped into the beverage for obtaining a beverage with a fine-bubble froth layer, it is advantageous that the location where the fluid communication 114 links up with the first mixing chamber is not too close to the air inlet opening, as otherwise, a favourable supply of air can be disturbed. Through the use of the first curvature 171 and the second curvature 172, for these and other reasons, desired connections of the fluid communication 114 to the first mixing chamber 110 can be realized.

It is advantageous when the cross section of the fluid communication 114 is not too great and the length of a fluid communication 114 is not too small. It is preferred that the maximum cross section of a fluid communication is, for instance, 1 to 3 mm, more particularly 1.5 to 2.5 mm. Preferably, the length of a fluid communication 114 is, for instance, 2 to 5 cm, more particularly 3 to 4 cm. Such cross sections that are not too great and lengths that are not too short of the fluid communication 114 prevent the storage space 108 from emptying undesirably rapidly when the second fluid is, for instance, a low viscous product. What can be achieved with such cross-sections that are not too great and lengths that are not too short of a fluid communication is, that a fluid communication of a particular size is suitable for use in different holders containing different sorts of second fluids. Here, for such a fluid communication of a specific size, a matching protrusion receiving recess 160 of the holder receiving portion 157 can be used, so that the protrusion receiving recess 160 is also suitable for different holders with different sorts of second fluids.

The exchangeable holder 102, 202 can be manufactured by means of the method described hereinafter. The first holder part 198 with the substantially flat contacting surface 160 and the substantially flat second holder part are provided. The storage space(s) 108, 108B and the first mixing chamber 110, 110B and, optionally, the outflow channels 182, the fluid communication(s) 114, 114B, the fluid inlet chamber(s) 186 and/or the chamber 180 are provided in the first holder part, each comprising a wall offset relative to the contacting surface, which, each, form part of the first holder part. The second holder part 199 is contacted against the contacting surface of the first holder part. Preferably, the second holder part is connected to the contacting surface of the first holder part after, preferably, the storage space(s) 108, 108B is/are filled with the second fluid.

If the first holder part is substantially plate-shaped, the at least one protrusion (173, 174, 175, 177, 178) can be formed on the plate-shaped first holder part by means of, for instance, vacuum formation, thermo formation, pressing, deep drawing and/or deep pressing, such that the storage space and the first mixing chamber, and, optionally, the outflow channels, the fluid communication(s), the fluid inlet chamber(s) and/or the chamber 180 are each, at least partly, bounded by the at least one protrusion.

The invention not limited in any manner to the embodiments outlined hereinabove. In the embodiment according to FIG. 2b, the storage spaces are side by side. It is also possible that the storage spaces are located one above the other. Further, instead of one or two storage spaces for the second fluids, the exchangeable holder can also comprise more than two storage spaces for the second fluids. As a consequence, the holder can comprise, instead of one or two fluid communications, also, more than two fluid communications. The second fluids are, for instance, mixable and/or soluble in the first fluid.

In the example, the storage spaces were filled with coffee concentrate and/or milk concentrate. Other second fluids, based or not based on concentrate are also conceivable, here, for instance a squash or powder for preparing a lemonade can be considered. The apparatus may further also be provided with additional storage spaces that may be filled with additives such as, for instance, soluble powders or concentrates. These powders too may be supplied to the first mixing chamber by, for instance, forcing out with the aid of a third fluid, or by emptying the respective storage space through squeezing. Here, for instance, flavour enhancers, sugars, cocoa and the like can be involved. Also, milk powder and/or creamer can be considered. Generally, it holds that, apart from a liquid such as a concentrate, the second fluid can also be a powder and the like, soluble in the first fluid or mixable with the first fluid, for instance soluble in a liquid such as water. A second fluid in the storage space can also comprise both a concentrate and a powder, in mixed form or not in mixed form.

In the examples given hereinabove, the dosing device can dispense the second fluid under pressure to the first chamber. As a result, in the embodiment according to FIGS. 2a, 2b and 3, the beverage will not be able to flow back into the storage space 108. It is also conceivable that the dosing device is an active dosing device that dispenses the second fluid by means of a pump.

In each of the outlined embodiments, the first fluid can be a gas such as steam. Then, the second fluid will usually already comprise a beverage to which, in the first mixing chamber 10, the gas is added by, for instance, heating the beverage. The gas can also comprise carbonic acid gas ($CO_2$) for obtaining a carbonated beverage. The first fluid can also comprise both a liquid and a gas. It is further possible that the restriction is omitted. Then, however, the first and/or second fluid is to be supplied to the first mixing chamber at a sufficiently great flow velocity in order that the first and second fluid mix together well.

In the embodiment of FIG. 1, the restriction is part of the apparatus and the supply channel is part of the holder. Naturally, also, both the restriction and the supply channel can be fixedly connected to the apparatus or both be fixedly connected to the holder.

According to the invention, the restriction can also be designed such that with the restriction, a mist is generated. To this end, the restriction can be manufactured from rubber with a feed-through opening whose diameter can vary somewhat with supply of the first fluid, for atomizing the first fluid. The atomized first fluid and the second fluid mix together while then, the beverage is obtained with whipped-in air. Then, the beverage, having a fine-bubble froth layer, can leave the first chamber. If the beverage comprises relatively large air bubbles, these can be stopped or broken by adjusting the size of the outflow opening(s). Here, the large bubbles cannot pass the outflow opening so that a beverage with a fine-bubble froth layer is dispensed.

In the embodiments outlined hereinabove, the first fluid is supplied to the first mixing chamber during at least a first period, and the second fluid is supplied to the first mixing chamber during at least a second period. Here, the first and second period can start and finish simultaneously. It is also possible that the second period starts earlier than the first period. However, other variations are also possible.

The fluid dispensing device 6 can further be designed for dispensing, at wish, different types of first fluids, such as steam, water, $CO_2$ et cetera. The selection hereof can be regulated with the control device 34 and will often be connected to the type of second fluid or second fluids in the exchangeable holder. If desired, this choice can also be set manually or be determined with the aid of the code reading unit 52.

The temperature of the first fluid can vary. For instance, the first fluid can also consist of water at room temperature or cold water. The temperature of the first fluid that is supplied to the holder for preparing a beverage can also vary over time.

Instead of tearable skins, the seals 38 can also comprise valves known per se which are operated by the apparatus, in order to be opened. The closure 17 can also be designed to be different from a removable seal. The sealing can, for instance, be provided with a valve that may be operated manually or by the apparatus. The sealing can also be formed by a tearable skin which tears open under the influence of a mixture of fluid and liquid in the first mixing chamber.

If the holder is provided with different storage spaces, one (1) needle can be pierced in the holder for supplying the third fluid to the second fluids in the different storage spaces. Here, the needle is pierced in a wall of the holder at a position below which there is a space which is in fluid communication or can be brought in fluid communication with the storage spaces. However, it is also possible that per storage space, a needle is pierced in a wall of the holder. Here, this may be in a wall of the respective storage spaces themselves, or in a wall of the holder, at positions below which are located different spaces which are or can be brought, respectively, in fluid communication with the different storage spaces.

In the preceding examples, the needle was pierced into the holder by activating the dosing device by pushing the button. However, it is also possible that the needle is pierced into the holder manually. The needle may be attached to a lid of the apparatus. The apparatus is then provided with, for instance, a receiving space for the holder which can be closed off by the lid. By closing the storage space with the lid, the (at least one) needle can then be pierced into the holder.

The holder can further also comprise an assembly of separate first and/or second holder parts, for instance an assembly of separate blister packs, an assembly of separate packages of a different type, or an assembly of one or more blister packs and one or more packages of a different type. Optionally, parts of such an assembly can be designed so as to be separable, for instance tearable, so that users can, for instance, remove parts of the holder when they wish to prepare, for instance, a cup of coffee without milk.

The fluid communication seal needs not necessarily be located on or near the transition from a storage space to the fluid communication. The fluid communication seal can, for instance, also be located on or near the transition from the fluid communication to the first mixing chamber, or be, for instance, an interruption of the channel of the fluid communication.

Such variants are all understood to fall within the framework of the invention. The temperature of the first fluid can vary. The first fluid may also consist of water at room temperature or cold water. Also, the temperature of the first fluid that is supplied to the holder for preparing a beverage can vary over time.

The volume of a storage space can for instance vary from 5 to 150 ml, more particularly from 6 to 50 ml. A passage opening of the restriction can for instance be 0.4 to 1.5 mm, more particularly 0.6 to 1.3 mm, still more particularly 0.7 to 0.9 mm. The pressure at which, in use, the liquid dispensing device dispenses the first fluid can be 0.6 to 12 bars, more particularly 0.7 to 2 bars, preferably 0.9 to 1.5 bars. The period during which the first fluid is supplied to the first mixing chamber for preparing the beverage can be from 2 to 90 seconds, more particularly from 10 to 50 seconds. The size of the air inlet opening, when this is fully opened, can be, for instance, 0.005 to 0.5 $mm^2$.

The invention claimed is:

1. A system for preparing a predetermined amount of beverage suitable for consumption, the system comprising:
   an exchangeable holder and an apparatus provided with a fluid dispensing device, wherein the exchangeable holder is detachably connected to the fluid dispensing device, wherein the fluid dispensing device is configured for dispensing at least one amount of at least a first fluid under pressure to the exchangeable holder, wherein the exchangeable holder includes:
- a first holder part having a substantially flat contacting surface and including a chamber and channel structure which is offset relative to one side of the substantially flat contacting surface and is formed by one of vacuum formation, thermos formation, pressing, deep drawing, and deep pressing, wherein the chamber and channel structure includes:
  - a first storage space containing a second fluid including a concentrate;
  - a second storage space containing a fourth fluid including a concentrate;
  - at least a first mixing chamber;
  - at least one outflow channel including a wall that is offset relative to the contacting surface and outflow opening which is in fluid communication with the first mixing chamber via the outflow channel for dispensing the beverage from the first mixing chamber;
  - at least a first fluid communication between the first storage space and the first mixing chamber for dispensing the second fluid to the first mixing chamber;
  - at least a second fluid communication between the second storage space and the first mixing chamber for dispensing the fourth fluid to the first mixing chamber; and
  - at least one inlet opening which is detachably connected to an outlet opening of the fluid dispensing device for supplying the first fluid to the first mixing chamber, wherein the exchangeable holder further includes:
- a second holder part which is of substantially flat design, and abuts against and is connected to the contacting surface of the first holder part and closes off the chamber and channel structure so that the first and second holder parts at least bound the first storage space, the second storage space, the first mixing chamber, and the first and second fluid communications;

wherein the first storage space and the first mixing chamber are separate chambers, connected or connectable via at least a second fluid communication that comprises a wall offset relative to the contacting surface;

wherein the exchangeable holder is a blister pack and wherein at least the first storage space, the second storage space, the first mixing chamber, the first fluid communication, the second fluid communication, and the outflow channel are each formed by an associated blister chamber in the first holder part of the blister pack;

wherein the apparatus comprises a dosing device which is designed for supplying the second fluid in a dosed manner from the first storage space to the first mixing chamber, and wherein the dosing device is configured for supplying the fourth fluid in a dosed manner from the second storage space to the first mixing chamber, wherein the fluid dispensing device is designed for supplying the first fluid under pressure to the first mixing chamber so that in the mixing chamber, the first fluid, the second fluid, and the fourth fluid mix together for obtaining the beverage which, then, leaves the exchangeable holder via the outflow opening.

2. The system of claim 1, wherein the offset walls are offset to the same side relative to the contacting surface, preferably in a direction away from the second holder part.

3. The system of claim 1, wherein the second holder part is connected to the contacting surface of the first holder part.

4. The system of claim 1, wherein the first holder part is substantially plate-shaped, and at least one of the first storage space and the first mixing chamber is, at least partly, bounded by a protrusion of the plate-shaped first holder part.

5. The system of claim 1, wherein the first holder part consists of one curved surface.

6. The system of claim 1, wherein the first storage space is located, when viewed in a plane of the contacting surface, next to the mixing chamber.

7. The system of claim 1, wherein the first mixing chamber comprises a first entrance opening and a second entrance opening placed at a distance from the first entrance opening while, in use, the first fluid enters the first mixing chamber via the first entrance opening and the second fluid enters the first mixing chamber via the second entrance opening.

8. The system of claim 1, wherein the first holder part is substantially plate-shaped, and at least one of the first storage space and the first mixing chamber is, at least partly, bounded by a protrusion of the plate-shaped first holder part, and wherein at least one of the at least one outflow channel and the at least one fluid communication is bounded, at least partly, by a protrusion of the plate-shaped first holder part.

9. The system of claim 3, wherein the plate-shaped first holder part is manufactured by means of vacuum formation, thermo formation, pressing, deep drawing and/or deep pressing.

10. The system of claim 1, wherein the first holder part is manufactured from plastic.

11. The system of claim 1, wherein the second holder part comprises a sheet-shaped wall.

12. The system of claim 11, wherein the second holder part is designed as a foil of at least one of plastic and metal.

13. The system of claim 1, wherein the at least one outflow opening and the first fluid communication are formed by the at least one blister chamber.

14. The system of claim 1, wherein the dosing device is designed for said dosed supply of the second fluid from the first storage space to the first mixing chamber by means of supplying a third fluid in a controllable manner, under pressure, to the second fluid in the storage space.

15. The system of claim 14, wherein the dosing device is designed for dosed supply of the second fluid from the first storage space to the first mixing chamber by means of pressurizing the second fluid with the pressure of the third fluid.

16. The system of claim 14, wherein the exchangeable holder comprises a fluid inlet chamber which is in fluid communication or can be brought in fluid communication with the first storage space for supplying the third fluid via the fluid inlet chamber to the storage space, while the fluid inlet chamber comprises a wall offset relative to the contacting surface.

17. The system of claim 1, wherein the dosing device for said dosed supply of the second fluid from the first storage space to the first mixing chamber is provided with a compressing unit for compressing the at least one storage space.

18. The system of claim 1, wherein the exchangeable holder consist of the first holder part and the second holder part connected thereto, and one or more ingredients for the beverage to be prepared.

19. The system of claim 1, wherein the dosing device is further designed for dosed supply of the fourth fluid from the second storage space to the first mixing chamber while, in use, the first fluid is also supplied under pressure to the first mixing chamber so that at least one of the second fluid and the fourth fluid on a first side, and the first fluid on a second side, mix together for obtaining the beverage which then leaves the holder via the outflow opening, while the second storage space is bounded by the first and second holder part.

20. The system of claim 19, wherein the first mixing chamber comprises a first entrance opening and a second entrance opening placed at a distance from the first entrance opening while, in use, the first fluid enters the first mixing chamber via the first entrance opening and the second fluid enters the first mixing chamber via the second entrance opening, and wherein the first mixing chamber comprises a third entrance opening which is at a distance from the first and second entrance openings while, in use, the fourth fluid enters the first mixing chamber via the third entrance opening.

21. The system of claim 19, wherein the dosing device is designed for said dosed supply of the fourth fluid from the second storage space to the first mixing chamber by means of supplying a fifth fluid in a controllable manner, under pressure, to the fourth fluid in the second storage space.

22. The system of claim 21, wherein the dosing device is designed for dosed supply of the fourth fluid from the second storage space to the first mixing chamber by means of pressurizing the fourth fluid with the pressure of the fifth fluid.

23. The system of claim 1, wherein the system is provided with a holder receiving portion which is designed for detachably receiving the holder for preparing a beverage suitable for consumption, which holder receiving portion is provided with recesses for receiving at least the first storage space, optionally the second storage space, the first mixing chamber and the first fluid communication, which recesses, viewed in a flat cross-section of the holder received in the holder receiving portion, have contours which correspond, at least partly, to contours of said first mixing chamber, the first storage space, the optionally second storage space, the first fluid communication and the optionally second fluid communication.

24. The system of claim 23, wherein the contours of the holder receiving portion correspond to the contours of the first mixing chamber, the first storage space, the optionally second storage space and the first fluid communication and the optionally second fluid communication.

25. An exchangeable holder designed to be connected to an apparatus provided with a fluid dispensing device for dispensing at least a first fluid under pressure to the exchangeable holder for preparing a beverage suitable for consumption, the exchangeable holder comprising:
   a first holder part having a substantially flat contacting surface and including a chamber and channel structure which is offset relative to one side of the substantially flat contacting surface and is formed by one of vacuum formation, thermo-formation, pressing, deep drawings, and deep pressing, wherein the chamber and channel structure includes:
      a first storage space, including a wall which is offset relative to the contacting surface and which forms part of the first holder part, wherein the first storage space is filled with a second fluid including a concentrate;
      a second storage space, including a wall which is offset relative to the contacting surface and which forms part of the first holder part, wherein the second storage space is filled with a fourth fluid including a concentrate;
      at least a first mixing chamber, including a wall which is offset relative to the contacting surface and which forms part of the first holder part;
      at least one outflow channel including a wall that is offset relative to a contacting surface and outflow opening which is in fluid communication with the first mixing chamber via the outflow channel for dispensing the beverage from the first mixing chamber,
      at least a first fluid communication between the first storage space and the first mixing chamber for dispensing the second fluid to the first mixing chamber, wherein the first fluid communication includes a wall offset relative to the contacting surface;
      at least a second fluid communication between the second storage space and the first mixing chamber for dispensing the fourth fluid to the first mixing chamber; wherein the second fluid communication includes a wall offset relative to the contacting surface; and
      at least one inlet opening which, in use, is detachably connectable to an outlet opening of the fluid dispensing device for supplying the first fluid to the first mixing chamber,
   wherein the exchangeable holder further includes:
   a second holder part which is of substantially flat design and abuts against and is connected to the contacting surface of the first holder part and closes off the chamber and channel structure so that the first and second holder parts at least bound the first storage space, the second storage space, the first mixing chamber, and the first and second fluid communications;
   wherein the first storage space and the first mixing chamber are separate chambers, connected or connectable via the at least first fluid communication;
   wherein the second storage space and the first mixing chamber are separate chambers which are connected or connectable via at least a second fluid communication;
   wherein the exchangeable holder is designed as a blister pack, and
   wherein at least the first storage space, the second storage space, the first mixing chamber, the first fluid communication, the second fluid communication, and the outflow channel are each formed by an associated blister chamber in the first holder part of the blister pack.

26. The exchangeable holder of claim 25, wherein the offset wall are offset to the same side relative to the contacting surface a direction away from the second holder part.

27. The exchangeable holder of claim 25, wherein the second holder part is connected to the contacting surface of the first holder part.

28. The exchangeable holder of claim 25, wherein the first holder part is substantially plate-shaped, and at least one of the first storage space and the first mixing chamber is, at least partly, bounded by a protrusion of the plate-shaped first holder part.

29. The exchangeable holder of claim 25, wherein the first holder part consist of one curved surface.

30. The exchangeable holder of claim 25, wherein the first storage space is located, when viewed in a plane of the contacting surface, next to the first mixing chamber.

31. The exchangeable holder of claim 25, wherein the first storage space and the first mixing chamber are separate chambers which are connected or connectable via the at least one fluid communication.

32. The exchangeable holder of claim 25, wherein the at least first fluid communication comprises a wall offset relative to the contacting surface.

33. The exchangeable holder of claim 25, wherein the first mixing chamber comprises a first entrance opening and a second entrance opening placed at a distance from the first entrance opening while, in use, the first fluid enters the first mixing chamber via the first entrance opening and the second fluid enters the first mixing chamber via the second entrance opening.

34. The exchangeable holder of claim 25 wherein the first mixing chamber comprises a first entrance opening and a second entrance opening placed at a distance from the first entrance opening while, in use, the first fluid enters the first mixing chamber via the first entrance opening and the second fluid enters the first mixing chamber via the second entrance opening, wherein the at least one outflow opening is in fluid communication via at least one outflow channel with the first mixing chamber, while the at least one outflow channel comprises a wall offset relative to the contacting surface.

35. The exchangeable holder of claim 32, wherein the first holder part is substantially plate-shaped, and at least one of the first storage space and the first mixing chamber is, at least partly, bounded by a protrusion of the plate-shaped first holder part, and wherein at least one of the at least one outflow channel and the at least one fluid communication is, at least partly, bounded by a protrusion of the plate-shaped first holder part.

36. The exchangeable holder of claim 28, wherein the plate-shaped first holder part is manufactured by means of at least one of vacuum formation, thermo formation, pressing, deep drawing and deep pressing.

37. The exchangeable holder of claim 25, wherein the first holder part is manufactured from plastic.

38. The exchangeable holder of claim 25, wherein the second holder part comprises a sheet-shaped wall.

39. The exchangeable holder of claim 38, wherein the second holder part is designed as a foil of at least one of plastic and metal.

40. The exchangeable holder of claim 25, wherein the exchangeable holder is designed as a blister pack, while at least the first storage space and the first mixing chamber, are formed by at least one blister chamber.

41. The exchangeable holder of claim 25, wherein the holder is designed such that, in use, a third fluid can be supplied with the apparatus, in a controllable manner, under pressure, to the second fluid in the first storage space for dispensing the second fluid in a dosed manner from the first storage space to the first mixing chamber while, in use, the first fluid is also supplied under pressure to the first mixing chamber, so that the second fluid and the first fluid mix together for obtaining the beverage which then leaves the holder via the outflow opening.

42. The exchangeable holder of claim 41, wherein the holder is designed such that, in use, the second fluid can be supplied in a dosed manner from the first storage space to the first mixing chamber by means of pressurizing the second fluid with the pressure of the third fluid.

43. The exchangeable holder of claim 41, wherein the holder is provided with means cooperating with the apparatus for supplying, in use, with the apparatus, the third fluid to the second fluid in the first storage space while the means cooperating with the apparatus comprise at least a locally weakened area of a wall of the holder for, in use, piercing a needle of the dosing device through this area for supplying the third fluid to the second fluid in the first storage space.

44. The exchangeable holder of claim 41, wherein the exchangeable holder comprises a fluid inlet chamber which is or can be brought in fluid communication with the first storage space for supplying the third fluid, via the fluid inlet chamber, to the first storage space, while the fluid inlet chamber comprises a wall offset relative to the contacting surface.

45. The exchangeable holder of claim 25, wherein the first storage space is bounded at least partly by a wall of a flexible or deformable material, so that the first storage space can be squeezed together for said dosed supply of the second fluid from the at least one storage space to the first mixing chamber.

46. The exchangeable holder of claim 25, wherein the exchangeable holder consists of the first holder part and the second holder part connected thereto, and one or more ingredients for the beverage to be prepared.

47. The exchangeable holder of claim 25, wherein the first mixing chamber comprises a first entrance opening and a second entrance opening placed at a distance from the first entrance opening while, in use, the first fluid enters the first mixing chamber via the first entrance opening and the second fluid enters the first mixing chamber via the second entrance opening, and wherein the first mixing chamber comprises a third entrance opening which is at a distance from the first and second entrance opening while, in use, the fourth fluid enters the first mixing chamber via the third entrance opening.

48. The exchangeable holder of claim 25, wherein the holder is designed in a manner such that, in use, a fifth fluid can be supplied with the apparatus, in a controllable manner, under pressure, to the fourth fluid in the second storage space for dosed supply of the fourth fluid from the second storage space to the first mixing chamber while, in use, the first fluid can also be supplied under pressure to the first mixing chamber so that the fourth fluid and the second fluid on a first side, and the first fluid on a second side, mix together for obtaining the beverage which then leaves the holder via the outflow opening.

49. The exchangeable holder of claim 48, wherein the holder is designed in a manner such that, in use, the fourth fluid can be supplied in a dosed manner from the second storage space to the first mixing chamber by means of pressurizing the fourth fluid with the pressure of the fifth fluid.

50. The exchangeable holder of claim 48, wherein the holder is provided with means cooperating with the apparatus for supplying, in use, with the apparatus, the fifth fluid to the fourth fluid in the second storage space while the means cooperating with the apparatus comprise at least a second locally weakened area of a wall of the holder for piercing, in use, a second needle of the dosing device through this area for supplying the fifth fluid to the fourth fluid in the second storage space.

51. The exchangeable holder of claim 48, wherein the exchangeable holder comprises a second fluid inlet chamber which is in fluid communication or can be brought into fluid communication with the second storage space for supplying the fifth fluid via the second fluid inlet chamber to the second storage space, while the second fluid inlet chamber comprises a wall offset relative to the contacting surface.

52. The exchangeable holder of claim 47, wherein the second storage space is bounded, at least partly, by a wall of a flexible or deformable material so that the second storage space can be squeezed together for said dosed supply of the fourth fluid from the second storage space to the first mixing chamber.

* * * * *